United States Patent
Wu et al.

(10) Patent No.: US 11,934,536 B2
(45) Date of Patent: Mar. 19, 2024

(54) DYNAMIC NETWORK RISK PREDICTING METHOD BASED ON A GRAPH NEURAL NETWORK

(71) Applicant: University of Chinese Academy of Sciences, Beijing (CN)

(72) Inventors: Desheng Wu, Beijing (CN); Lei Li, Beijing (CN); Yunhao Xie, Beijing (CN); Junran Dong, Beijing (CN); Longbo Huang, Beijing (CN)

(73) Assignee: UNIVERSITY OF CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/318,882

(22) Filed: May 17, 2023

(65) Prior Publication Data
US 2024/0028744 A1  Jan. 25, 2024

(30) Foreign Application Priority Data
Jul. 21, 2022 (CN) .......................... 202210861878.9

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| 10,862,914 | B1 * | 12/2020 | Mezic ................... G06F 21/577 |
| 11,645,293 | B2 * | 5/2023 | Pelloin ............... G06F 18/2433 |
| | | | 706/11 |
| 2018/0004948 | A1 * | 1/2018 | Martin ................ H04L 63/1425 |

(Continued)

FOREIGN PATENT DOCUMENTS

| CN | 111461907 A | 7/2020 |
| CN | 113065974 A | 7/2021 |

(Continued)

OTHER PUBLICATIONS

Lei Li "Forecasting the risk at infractions: an ensemble comparison of machine learning approach" Industrial Management & Data Systems, vol. 122 No. 1, 2022, pp. 1-19.

(Continued)

*Primary Examiner* — Meng Li
(74) *Attorney, Agent, or Firm* — Stuart H. Mayer; Kaplan Breyer Schwarz LLP

(57) ABSTRACT

Disclosed is a dynamic network risk predicting method based on a graph neural network, which comprises the following steps: collecting network data firstly and constructing a network data sequence graph; extracting the time sequence of the network data sequence graph and obtaining a time sequence feature graph; extracting network attribute features, network structure features and network change features of the dynamic network; obtaining the representation vector of the network sequence graph by learning the representation vector; constructing the anomaly detection model and carrying out the dynamic network risk prediction.

4 Claims, 1 Drawing Sheet

(56) References Cited

U.S. PATENT DOCUMENTS

| | | | |
|---|---|---|---|
| 2020/0074246 A1 | 3/2020 | Goyal et al. | |
| 2021/0089927 A9* | 3/2021 | Ryan | G06F 11/0754 |
| 2021/0237724 A1* | 8/2021 | Zhao | B60W 50/0205 |
| 2023/0094389 A1* | 3/2023 | You | G06N 5/01 |
| | | | 706/62 |

FOREIGN PATENT DOCUMENTS

| | | | |
|---|---|---|---|
| CN | 113225199 A * | 8/2021 | |
| CN | 113298634 A * | 8/2021 | |
| CN | 113516226 A | 10/2021 | |
| CN | 113852492 A | 12/2021 | |
| CN | 115034596 A * | 9/2022 | |

OTHER PUBLICATIONS

Shunfei Ji "Graph Neural Network and Temporal Information Based Dynamic Network Representation Learning" A Thesis submitted to Xidian University in partial fulfillment of the requirements for the degree of Master in Control Science and Engineering, May 2021.

* cited by examiner

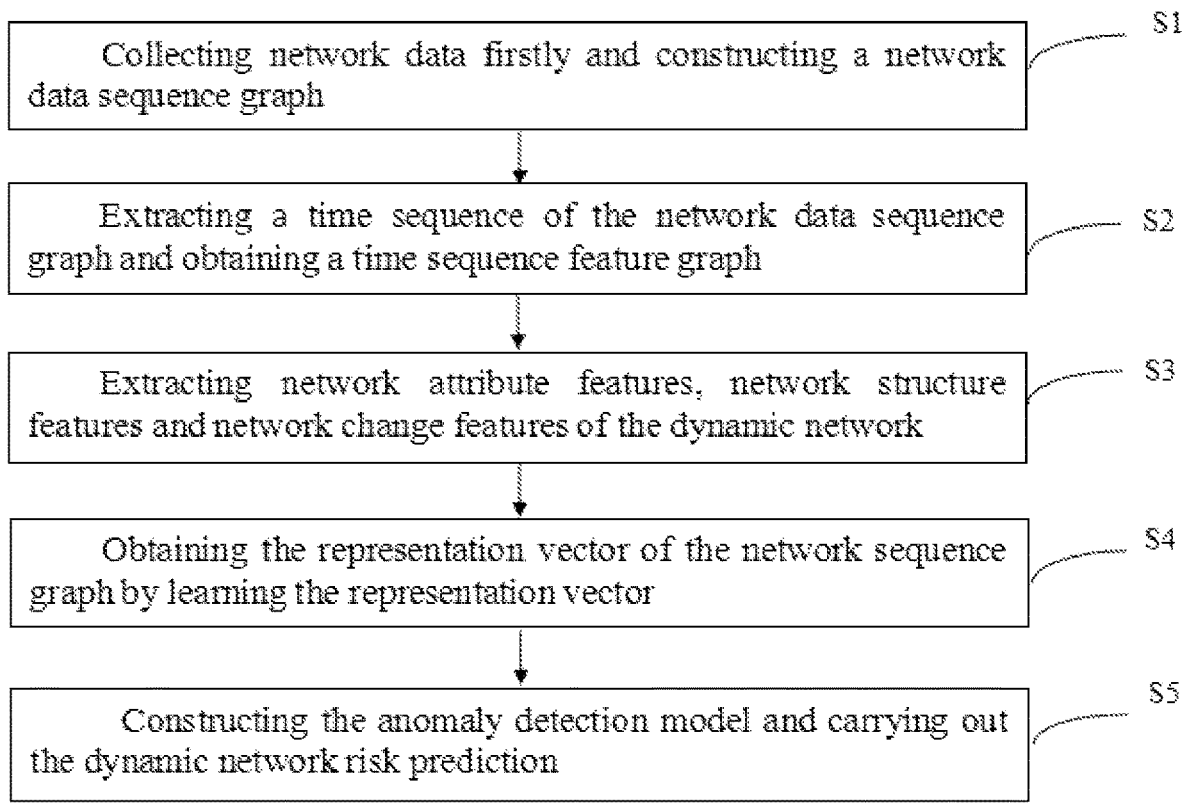

DYNAMIC NETWORK RISK PREDICTING METHOD BASED ON A GRAPH NEURAL NETWORK

CROSS-REFERENCE TO RELATED APPLICATIONS

This application claims priority to Chinese Patent Application No. 202210861878.9, filed on Jul. 21, 2022, the contents of which are hereby incorporated by reference.

TECHNICAL FIELD

The application relates to the technical field of network risk prediction, and in particular to a dynamic network risk predicting method based on a graph neural network.

BACKGROUND

The network is composed of several nodes and links connecting these nodes, which represents the interrelation between multiple objects. In the network structure, a child node may have two or more parent nodes, and there may be two or more connections between the two nodes. Network structure data is essentially an extension of a hierarchical structure, and the network structure data has been widely concerned in recent years because of its powerful representation ability. In real life, networks may be classified into static network and dynamic networks, in which static networks do not change, while dynamic networks keep changing. In the dynamic networks, there may be some elements with changing laws or anomaly features, such as communication with aggressive behaviors.

The graph neural network is a new type of artificial intelligence neural network, and its input is graph structure data, and its output is representation vectors, which is used to express a high generalization of properties and features. Because graph neural network may effectively learn and mine the attribute information and structure features of data, and solve the tasks related to graph data in an end-to-end way. Therefore, the graph neural network has been widely used in the related applications about of graph data analysis and processing.

In order to maintain stable dynamic networks, it is necessary to predict the dynamic network risk to prevent network attacks in advance. However, most of the existing predicting methods for dynamic network anomaly risk are inefficient and cannot extract the structure features and attribute features of the network at the same time, so they may not fully detect the anomaly situation of the network. Moreover, the existing risk predicting methods do not take into account the anomaly changes in the network during the risk predicting process, which has a negative impact on the accuracy of the network anomaly risk prediction, which reduces the accuracy of the dynamic network risk prediction and is not convenient for the early deployment of network defense. At present, the research on applying graph neural network in network anomaly detection is not intensive enough to provide substantial assistance to the dynamic network risk prediction, so the application proposes a dynamic network risk predicting method based on a graph neural network to solve the problems existing in the prior art.

SUMMARY

In view of the above problems, the objective of the present application is to propose a dynamic network risk predicting method based on a graph neural network. The method may extract the structure features and attribute features of the network at the same time by using graph neural network to model the time sequence feature graph, so that more anomaly situations may be mined; the change of the dynamic network is modeled by introducing the long-short term memory network, so that the anomaly changes in the network are considered in the risk predicting process, so the accuracy of dynamic network risk prediction is improved, and practical anomalies in the network may be mined, which solves the problems of low accuracy and low efficiency of conventional network risk predicting methods.

In order to achieve the objective of the application, the application is realized by the following technical scheme: a dynamic network risk predicting method based on a graph neural network, including the following steps:

S1, selecting a time period, adopting a zero-copy message capture technology to capture network data packets of a dynamic network to be predicted in the time period, standardizing data in the network data packets, constructing a network data sequence graph by using standardized data, and preprocessing the network data sequence graph by using a method of image enhancement and image transformation;

S2, extracting a time sequence of the network data sequence graph through time sequence sub-sequence mining, and mining a frequent time sequence sub-sequence through an extracted time sequence to obtain a time sequence feature graph of the network data;

S3, selecting different time points firstly, modeling the time sequence feature graph through the graph neural network, extracting network attribute features and network structure features of the time sequence feature graph at the different time points, and then extracting network change features of the time sequence feature graph by using a long-short term memory model and by combining extracted features of the time sequence feature graph at the different time points;

S4, according to extracted network attribute features, network structure features and network change features, performing a representation vector learning by using a method of maximizing mutual information between a maximization global representation vector and a local representation vector, and obtaining a representation vector of the time sequence feature graph; and S5, constructing an anomaly detection model by using an anomaly algorithm on a data stream, and then carrying out an anomaly detection of the representation vector of the time sequence feature graph by using the anomaly detection model, and giving an anomaly score; finally, performing a risk prediction on the dynamic network according to the anomaly score.

Optionally, in the S1, the specific ways of preprocessing the network data sequence graph by using a method of image enhancement and image transformation are as follows: carrying out a frequency domain enhancement by high-pass filtering and low-pass filtering on the network data sequence graph firstly, and then transforming the network data sequence graph from spatial domain to frequency domain by Fourier transform.

Optionally, in the S3, the graph neural network is a graph convolution neural network, and the specific steps of extracting the network attribute features and the network structure features are as follows: imitating a convolution operation in the frequency domain on the time sequence feature graph through the graph convolution neural network firstly, then mapping the time sequence feature graph to a frequency space, and converting the time sequence feature graph back to a node space after carrying out the convolution operation in the frequency space, and extracting the network attribute features and the network structure features of the time sequence feature graph.

Optionally, in the S3, the specific steps of extracting the network change features are as follows: using long-short term memory cyclic neural network to model sequence change on the time sequence feature graph, and then using a long-short term memory network to extract the network change features of the time sequence feature graph in this model.

Optionally, in the S4, the specific steps of learning the representation vector are as follows: obtaining a global representation of the time sequence feature graph from the representation vectors of nodes and edges on the time sequence feature graph through a reading function, and then maximizing the mutual information of the global representation vector and the local representation vector by the method of maximizing the mutual information to obtain the representation vector of the time sequence feature graph.

Optionally, in the S5, during a process of constructing the anomaly detection model, network attack data in a specific time are collected from computer-simulated network attack scenarios on different local area networks as a data set, the data in a first half of the specific time in the data set are used as a training set to train the model, and the data in a second half of the specific time are used as a test set to test the model.

Optionally, in the S5, in the anomaly detection model, the anomaly detection on the representation vector of time sequence feature graph is performed by using a robust random cutting forest algorithm combined with the data structures thereof, and the anomaly score is given according to detection results, and finally dynamic network risk is predicted according to the anomaly score, and a network defense is deployed in advance according to prediction results.

Optionally, in the S5, an anomaly score threshold is set, and it is judged that there is an anomaly risk when the given anomaly score exceeds a preset threshold, and there is no anomaly risk if the given anomaly score is within the preset threshold.

The method has the following beneficial effects.

The method may extract the structure features and attribute features of the network at the same time by using the graph neural network to model the time sequence feature graph, so that more anomaly situations may be mined; the change of the dynamic network is modeled by introducing the long-short term memory network, so that the anomaly changes in the network are considered in the risk predicting process, so the accuracy of dynamic network risk prediction is improved, and practical anomalies in the network may be mined; the predicting process is easy to operate and has high controllability; compared with the conventional risk predicting method, it not only improves the efficiency of risk prediction, but also improves the accuracy of risk prediction, which brings substantial assistance to the dynamic network risk predictions, facilitates users to deploy network defense in advance against network risks, and greatly improves network security.

BRIEF DESCRIPTION OF THE DRAWINGS

In order to more clearly explain the embodiments of the present application or the technical scheme in the prior art, the drawings needed to be used in the description of the embodiments or the prior art will be briefly introduced below. Obviously, the drawings in the following description are only some embodiments of the present application, and other drawings may be obtained by ordinary people in the field without paying creative labor.

FIG. 1 is a schematic diagram of the method flow of the present application.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not all the whole embodiments. Based on the embodiments in the present application, all other embodiments obtained by ordinary technicians in the field without creative work belong to the scope of protection of the present application.

Referring to FIG. 1, this embodiment provides a dynamic network risk predicting method based on a graph neural network, which includes the following steps:

S1, a time period is selected; a zero-copy message capture technology is adopted to capture network data packets of the dynamic network to be predicted in the time period; data in the network data packets are standardized; a network data sequence graph is constructed by using the standardized data, and the network data sequence graph is preprocessed by using a method of image enhancement and image transformation.

The specific ways of preprocessing the network data sequence graph by using a method of image enhancement and image transformation are as follows: a frequency domain enhancement is carried out by high-pass filtering and low-pass filtering on the network data sequence graph firstly; the clarity of network data sequence graph is improved by image enhancement, and then the network data sequence graph is transformed from spatial domain to frequency domain by Fourier transform, and the image is concise and effective by image change, which is helpful for extracting time sequence features subsequently.

The zero-copy message capture technology is used to capture the data packets of the dynamic network, which reduces the number of data copies, improves the speed of data path and increases the network throughput, and therefore improves the efficiency of risk prediction.

S2, a time sequence of the network data sequence graph is extracted through a-frequent time sequence sub-sequence mining, and the frequent time sequence sub-sequence is mined through the extracted time sequence to obtain a time sequence feature graph of the network data.

S3, different time points are selected firstly; the time sequence feature graph is modeled through the graph neural network; network attribute features and network structure features of the time sequence feature graph are extracted at the different time points; modeling the time sequence feature graph through the graph neural network may simultaneously extract the structure features and attribute features of the network and mine more anomaly situations; then network change features of the time sequence feature graph are extracted by using a long-short term memory model and by combining the extracted features of the time sequence feature graph at the different time points. The change of network is modeled by a long-short term memory network, so that the anomaly changes in the network is considered and added in the process of risk prediction, and the accuracy of prediction is improved.

The graph neural network is a graph convolution neural network, and the specific steps of extracting the network attribute features and the network structure features are as follows: imitating a convolution operation in the frequency domain on the time sequence feature graph through the graph convolution neural network firstly, then mapping the time sequence feature graph to a frequency space, and converting the time sequence feature graph back to a node space after carrying out the convolution operation in the frequency space, and extracting the network attribute features and the network structure features.

The specific steps of extracting the network change features are as follows: using long-short term memory cyclic neural network to model sequence change on the time sequence feature graph, and then using a long-short term memory network to extract the network change features of the time sequence feature graph in this model.

S4, a representation vector is learned by maximizing mutual information between a global representation vector and a local representation vector according to the extracted network attribute features, network structure features and network change features to obtain the representation vector of the time sequence feature graph.

The specific steps of learning the representation vector are as follows: obtaining a global representation of the time sequence feature graph from the representation vectors of nodes and edges on the time sequence feature graph through a reading function, and then maximizing the mutual information of the global representation vector and the local representation vector by the method of maximizing the mutual information to obtain the representation vector of the time sequence feature graph.

S5, an anomaly detection model is constructed by using an anomaly algorithm on a data stream. In the anomaly detection model, the anomaly detection on the representation vector of time sequence feature graph is performed by using a robust random cutting forest algorithm combined with the data structures thereof, and the anomaly score is given according to detection results. Finally an anomaly score threshold is set, and when the given anomaly score exceeds a preset threshold, it is judged that there is an anomaly risk, and if the given anomaly score is within the preset threshold, it is judged that there is no anomaly risk, and network defense is deployed in advance according to the prediction results.

In the process of constructing anomaly detection model, network attack data in a specific time are collected from computer-simulated network attack scenarios on different local area networks as a data set, the data in a first half of the specific time in the data set are used as a training set to train the model, and the data in a second half of the specific time are used as a test set to test the model.

In this embodiment, network data is collected firstly and a network data sequence graph is constructed; then the time sequence of the network data sequence graph is extracted and a time sequence feature graph is obtained; then the network attribute features, network structure features and network change features of the dynamic network are extracted; then the representation vector of the network sequence graph is obtained by learning the representation vector; finally, the anomaly detection model is constructed and the dynamic network risk prediction is carried out. Compared with the existing network risk predicting method, the results show that the risk predicting method proposed by the application is more efficient, the result is more accurate and may be widely popularized and applied.

The above is only the preferred embodiment of the application, and it is not used to limit the application. Any modification, equivalent substitution, improvement, etc. made within the spirit and principle of the application should be included in the protection scope of the application.

What is claimed is:

1. A dynamic network risk predicting method based on a graph neural network, comprising the following steps:
S1, selecting a time period, adopting a zero-copy message capture technology to capture network data packets of a dynamic network to be predicted in the time period, standardizing data in the network data packets, constructing a network data sequence graph by using standardized data, and preprocessing the network data sequence graph by using a method of image enhancement and image transformation;
in the S1, specific ways of preprocessing the network data sequence graph by using the method of image enhancement and image transformation are as follows: carrying out a frequency domain enhancement by high-pass filtering and low-pass filtering on the network data sequence graph firstly, and then transforming the network data sequence graph from a spatial domain to a frequency domain by Fourier transform;
S2, extracting a time sequence of the network data sequence graph through time sequence sub-sequence mining, and mining a frequent time sequence sub-sequence through an extracted time sequence to obtain a time sequence feature graph of the network data;
S3, selecting different time points firstly, modeling the time sequence feature graph through the graph neural network, extracting network attribute features and network structure features of the time sequence feature graph at the different time points, and then extracting network change features of the time sequence feature graph by using a long-short term memory model and by combining extracted features of the time sequence feature graph at the different time points;
in the S3, specific steps of extracting the network change features are as follows: using a long-short term memory cyclic neural network to model sequence change on the time sequence feature graph, and then using a long-short term memory network to extract the network change features of the time sequence feature graph in this model;
S4, according to extracted network attribute features, network structure features and network change features, performing a representation vector learning by using a method of maximizing mutual information between a maximization global representation vector and a local representation vector, and obtaining a representation vector of the time sequence feature graph;
in the S4, specific steps of performing the representation vector learning are as follows: obtaining a global representation of the time sequence feature graph from a representation vector of nodes and edges on the time sequence feature graph through a reading function, and then by using the method of maximizing the mutual information to perform a maximizing training of the mutual information of the global representation vector and the local representation vector, and obtaining the representation vector of the time sequence feature graph; and S5, constructing an anomaly detection model by using an anomaly algorithm on a data stream, and then carrying out an anomaly detection of the representation vector of the time sequence feature graph by using the anomaly detection model, and giving an anomaly score; and finally, performing a risk prediction on the dynamic network according to the anomaly score;

in the S5, the anomaly detection model uses a robust random cutting forest algorithm combined with the data structures thereof to perform an anomaly detection on the representation vector of time sequence feature graph, and the anomaly score is given according to detection results, and finally a dynamic network risk is predicted according to the anomaly score, and a network defense is deployed in advance according to prediction results.

2. The dynamic network risk predicting method based on a graph neural network according to claim 1, wherein in the S3, the graph neural network is a graph convolution neural network, and specific steps of extracting the network attribute features and the network structure features are as follows: imitating a convolution operation in the frequency domain on the time sequence feature graph through the graph convolution neural network firstly, then mapping the time sequence feature graph to a frequency space, and converting the time sequence feature graph back to a node space after carrying out the convolution operation in the frequency space, and extracting the network attribute features and the network structure features of the time sequence feature graph.

3. The dynamic network risk predicting method based on a graph neural network according to claim 1, wherein in the S5, during a process of constructing the anomaly detection model, network attack data in a specific time are collected from computer-simulated network attack scenarios on different local area networks as a data set, data in a first half of the specific time in the data set are used as a training set to train the model, and data in a second half of the specific time are used as a test set to test the model.

4. The dynamic network risk predicting method based on a graph neural network according to claim 1, wherein in the S5, an anomaly score threshold is set, and it is judged that there is an anomaly risk when the given anomaly score exceeds a preset threshold, and there is no anomaly risk if the given anomaly score is within the preset threshold.

* * * * *